US005637552A

United States Patent [19]

Hahn et al.

[11] Patent Number: 5,637,552
[45] Date of Patent: Jun. 10, 1997

[54] PROCESS FOR PRODUCING NEUTRAL TO ALKALI COLOR DEVELOPER PIGMENTS

[75] Inventors: Reinhard Hahn, Vilsheim; Friedrich Ruf, Ast, both of Germany

[73] Assignee: Sud-Chemie A.G., Germany

[21] Appl. No.: 411,821

[22] PCT Filed: Aug. 10, 1994

[86] PCT No.: PCT/EP94/02656

§ 371 Date: Jun. 13, 1995

§ 102(e) Date: Jun. 13, 1995

[87] PCT Pub. No.: WO95/05422

PCT Pub. Date: Feb. 23, 1995

[30] Foreign Application Priority Data

Aug. 12, 1993 [DE] Germany ............... 43 27 158.8

[51] Int. Cl.$^6$ ............................................. B41M 5/155
[52] U.S. Cl. .......................... 503/225; 106/400; 106/416; 106/31.16; 106/31.2; 423/326; 423/327.1; 423/328.2; 423/331; 423/332
[58] Field of Search ........................... 106/21 E, 20 C, 106/400, 416, DIG. 4; 503/225; 423/326, 327.1, 328.1, 328.2, 331

[56] References Cited

U.S. PATENT DOCUMENTS

| | | | |
|---|---|---|---|
| 3,622,364 | 11/1971 | Sugahara et al. | 106/288 B |
| 3,753,761 | 8/1973 | Sugahara et al. | 117/36.2 |
| 4,040,648 | 8/1977 | Isaac et al. | 503/225 |
| 4,053,324 | 10/1977 | Hayden, Jr. et al. | 106/288 B |
| 4,255,276 | 3/1981 | Fahn et al. | 252/184 |
| 4,405,371 | 9/1983 | Sugahara et al. | 106/21 |
| 4,830,843 | 5/1989 | Usui et al. | 423/331 |
| 5,013,709 | 5/1991 | Ogawa et al. | 503/225 |

FOREIGN PATENT DOCUMENTS

| | | | |
|---|---|---|---|
| 76342 | 4/1983 | European Pat. Off. | 503/225 |
| 111564 | 6/1984 | European Pat. Off. | 503/225 |
| 144472 | 6/1985 | European Pat. Off. | 503/225 |
| 2203317 | 5/1974 | France | 503/225 |
| 58-21738 | 12/1983 | Japan | 503/225 |
| 2051847 | 1/1981 | United Kingdom | 303/209 |

*Primary Examiner*—Bruce H. Hess
*Attorney, Agent, or Firm*—Scott R. Cox

[57] ABSTRACT

A process is described for producing neutral to alkaline color developer pigments for use in carbon-free transfer papers from an acid-activated smectic phyllosilicate and basically reacting chemicals. The process is characterized in that the acid-activated phyllosilicate with a layer structure which is essentially still intact is reactive without intermediate drying with the basically-reacting chemicals up to partial or complete decomposition of the amorphous silicic acid formed on the corners and edges of the phyllosilicate crystallites without significant re-exchange of the hydronium ions inserted between the layers of the phyllosilicate by alkali or earth alkali ions.

The color developer pigments can be used in suspensions with concentrations from 30 to 50% by weight, preferably from roughly 38 to 48% by weight.

16 Claims, No Drawings

PROCESS FOR PRODUCING NEUTRAL TO ALKALI COLOR DEVELOPER PIGMENTS

A. BACKGROUND OF INVENTION

The invention relates to a process for producing neutral to alkali color developer pigments for use in carbon-free copying paper.

Carbon-free self-copying paper or reaction transfer paper has been known since the early 1950s. They are currently used in large amounts in sets of banking and shipping forms, delivery tickets, bills and so forth. Usually they consist of two or more sheets of paper on top of one another, the upper one having a color donor layer on the back (CB=coated back), the bottom one having a color acceptor layer (CF= coated front) on the front. The main component of the color donor layer includes thick-walled microcapsules of gelatin, polyurethane, melamine-formaldehyde and similar substances which contain solutions of dyes in the so-called leuco form. These only slightly colored dye precursors, predominantly from the class of di- or triphenyl methanes, thiazines, spiropyranes or fluoranes act as electron donors (Lewis bases) and can be converted into the dye form with electron acceptors (Lewis acids) in a chemical reaction. These Lewis acids are located in the color acceptor layer in the form of acid phenolic resins, zinc salicylates or acid-activated clay minerals, for example, acid-activated smectic layer silicates. If the walls of the pertinent microcapsules are destroyed by the pressure of the writing instrument when writing on self-copying paper, the contents of the capsules, the dye solution, are released and developed on the Lewis acid acceptor layer, forming a copy.

Especially suitable color developer pigments can also be produced by acid activation of clay minerals, such as attapulgites or preferably smectic phyllosilicates such a bentonites.

Preferably calcium bentonite is used, therefore a phyllosilicate with negative layer charges which are balanced by calcium ions on intermediate layer locations. In the activation process which takes place by boiling with mineral acids, usually hydrochloric acid or sulfuric acid, the bentonite is chemically changed: first, the interlamellarly bound $Ca^{2+}$ is replaced in an ion exchange step by 2 $H^+$. Second, the layer lamella is attacked from the edges and the central octahedrally coordinated $Al^{3+}$, $Fe^{2+}$, $Fe^{3+}$ and/or $Mg^{2+}$ ions, depending on the activation conditions, are more or less dissolved and washed out. As the reaction continues these polyvalent cations are partially bound again on or between the negatively charged layers. The product can thus be described as a $H^+/Al^{3+}/Fe^{3+}/Mg^{2+}/Ca^{2+}$ bentonite with voluminous amorphous silicic acid bound to the edges. It is characterized by very high specific surfaces of roughly 300 $m^2/g$ (measured according to the BET method), high adsorption capacity and pore volume and by the presence of many acid centers (Brönstedt and Lewis acids) on which development of the dyes proceeds catalytically.

The high-surface, acid-activated bentonite with layer structure (x-ray diffraction spectrum) which is essentially still intact, has as a phyllosilicate a pronounced lamellar structure with very high shape factor of >30:1. In aqueous slurries and coating compositions compared to "normal" coating pigments such as calcium carbonate or kaolin, this causes unfavorable flow behavior, characterized by high structural viscosity and thixotropy at average solid contents of roughly 40%. For these reasons it is absolutely essential to disperse, treat, and coat acid-activated bentonites at pH of roughly 7–10 since at that range, the viscosity of these pigments is minimum. The pH is adjusted as usual by adding sodium hydroxide solution. In any case, problems often arise during dispersion since a strongly acid pigment must be distributed in an alkaline-medium. pH shocks occur which are expressed in formation of agglomerates and in thickening.

Thus, with these active pigments even with optimum coating composition preparation, pH control and use of dispersing agents, a solid content of the coating composition of roughly 45% cannot ordinarily be exceeded. This has adverse effects on dryer capacity and the running speed of the coating machine.

A sensitization pigment for color reaction recording materials is known from DE-B 2 701 056. It can be obtained by ion exchange with lithium on a dioctahedral montmorillonite. Subsequent heat treatment up to irreversible collapse of the montmorillonite structure and grinding to a particle size of less than 15 microns. Heat treatment which is done at roughly 160° to 300° C. destroys the laminar structure of the montmorillonite. This is manifested in a change of the x-ray diffraction spectrum in that the planar base distance of the montmorillonite decreases from 12 to 15 Å to roughly 8.9 to 10.2 Å.

A color developer is known from EP-B-0 044 645 for pressure-sensitive copy paper. It has been obtained from a clay mineral with a laminar structure consisting of regular silica tetrahedra by acid treatment. It has an electron diffraction pattern which can be ascribed to crystals of laminar structure of regular silica acid tetrahedra which, however, in x-ray diffraction analysis does not exhibit essentially any diffraction pattern which can be ascribed to the crystals of this laminar structure and which contains as element components not only oxygen, but also silicon and magnesium and/or aluminum. In acid treatment the $SiO_2$ content is raised to roughly 82 to 96.5% by weight, i.e., the laminar structure of the montmorillonite is largely destroyed.

A similar color developer for pressure sensitive copy paper is described in JP-A-58-217389 (Patent Abstracts of Japan, M-286, 1984, Vol. 8, No. 69). To produce this color developer one likewise proceeds from acid-treated clay minerals such a montmorillonites, with a $SiO_2$ content of 82 to 96.5% by weight, in the x-ray diffraction spectra of which regular silica tetrahedra can no longer be ascertained. These substances are then converted with Mg and Al compounds.

A magnesium phyllosilicate is known from U.S. Pat. No. 4,830,843 which can be used as a color developer for pressure-sensitive recording papers. This phyllosilicate is produced by conversion of an active silicic acid and an active alumino-silicic acid with magnesium oxide or hydroxide under hydrothermal conditions. If one proceeds from an active alumino-silicic acid, for example, an acid-treated montmorillonite, acid treatment is conducted so far that all the aluminum is dissolved out so that it no longer appears in the formula of the magnesium silicate obtained as an end product.

A color developer for carbon-free copying paper is known from FR-A-2 203 317 which is obtained by acid activation of clays, such as saponite or hectorite. Posttreatment with alkalis does not take place.

A color developer for pressure-sensitive copy papers is known from EP-A-0 111 564 which is obtained by acid treatment of clay minerals, the $SiO_2$ content being raised to 82 to 96.5%. The acid-activated mineral obtained is brought into contact in an aqueous medium with a soluble magnesium and/or aluminum compound, the magnesium and/or aluminum ions being incorporated into the laminar structure with exchange of hydronium ions.

Production of montmorillonite pigments with reduced charge is known from U.S. Pat. No. 4,053,324, the interlayer cations being replaced by treatment with acid by hydronium ions. The hydronium ions are then replaced by lithium ions which penetrate through the tetrahedral layer into the octahedral layer and reduce the layer charge. Acid treatment of the montmorillonite is done under comparatively mild conditions so that no more amorphous silicic acid forms on the corners and edges of the montmorillonite crystallite.

A process for producing color developer material is known from GB-A-2 051 847, a dioctahedral montmorillonite being washed in an aqueous solution with acid, whereupon the pH of the dispersion is set to roughly 7 to 11 by adding an alkali potassium compound. The montmorillonite is washed out with acid under comparatively mild conditions so that the lattice is not yet partially dissolved.

A color developer for carbon-free copy paper is known from EP-A-0 076 342 which represents a dry physical mixture of particulate activated clay with sodium silicate and optionally one or several dispersing agents. Therefore there is no reaction product present.

An adsorptively acting silicate agent for binding alkaline earth metal ions is known from DE-C-2 727 053 which has been obtained by dry or wet mixing of a material, obtained by acid activation of a mineral from the montmorillonite-beidelite series, with alkali hydroxide, carbonate, phosphate or borate. In this case the H ions on the surface and between the layers of the acid-activated material are exchanged. The agent is used first of all as a combined adsorption and water softening agent.

A color former for pressure sensitive reproduction paper and a process for its production are known from DE-B-1 809 778, in which an acid-treated dioctahedral montmorillonite clay mineral is mixed with natural dioctahedral montmorillonite clay minerals in order to produce a certain secondary color developing capacity. To further improve the color developing action alkaline substances such as sodium silicate, sodium pyrophosphate or alkaline earth metal hydroxides, for example, hydrated lime, can be added. Such an addition takes place however only in the form of physical mixing.

A similar color developer composition for pressure-sensitive recording sheets is known from EP-B-0 144 472 which contains a color developer based on a clay mineral with a laminar structure with certain properties, a metal compound in the form of oxides and/or hydroxides of calcium, magnesium and zinc, and optionally another color developer with a $SiO_2$ content of not more than 80%. In this case as well only physical mixing of the acid clay mineral with the calcium, magnesium and zinc compound takes place.

It was surprisingly found that the viscosity and thixotropy of acid-activated smectic phyllosilicates can now be significantly improved if the acid-activated phyllosilicate is chemically converted without intermediate drying under certain condition with the basically-reacting chemicals.

B. SUMMARY OF INVENTION

The invention therefore relates to a process for producing neutral to alkaline color developer pigments for use in carbon-free copying papers from an acid-activated smectic phyllosilicate and basically-reacting chemicals. This process is characterized by the fact that the acid-activated phyllosilicate with a laminar structure, which is essentially still intact, is converted without intermediate drying with the basically-reacting chemicals up to partial or complete decomposition of the amorphous silicic acid formed on the corners and edges of the phyllosilicate crystallites without significant re-exchange of the hydronium ions incorporated between the layers of the phyllosilicate by alkali or earth alkali ions.

Acid activation can be done in the conventional manner, preferably mineral acids, such as hydrochloric acid or sulfuric acid, being used. Generally the acid concentration for hydrochloric acid is 25 to 40%, for sulfuric acid 55 to 70%, the temperature roughly 90° to 98° C. and length of treatment roughly 7 to 15 hours. It is important that the acid activation is not pursued so far that only amorphous silicic acid is still present, i.e., the laminar structure is still essentially intact. The phyllosilicate can however be converted either directly after separation of the acid or even later with the basically-reacting chemicals. In the latter case measures necessarily are taken to ensure that the acid-activated phyllosilicate which usually occurs as a wet filter cake remains wet. Water content should preferably not drop below 20%. It is assumed that when the acid-activated layer silicate is dried the amorphous silicic acid foraged on the corners and edges of the laminated silicate crystallite is recrystallized or deactivated in some other way so that it can no longer be attacked so easily by the basic chemicals and the reaction hardly occurs or does as incompletely.

Preferably the conversion of the acid-activated smectic phyllosilicate is done with the basically-reacting chemicals at a water content of roughly 75 to 15% by weight, especially 70–20% by weight.

In doing so we preferably proceed from an acid-activated smectic phyllosilicate with a specific surface of roughly 280 to 350 $m^2/g$ and a content of amorphous silicic acid from 20 to 45% by weight (relative to all the material). The specific surface is determined according to the so-called BET method described in the J. Am. Soc. 60, 309 (1938) by S. Brunauer, P. H. Emmet and E. Teller at the temperature of liquid nitrogen (single point method according to DIN 66 13 1 and 66 132).

The content of amorphous silicic acid is determined as follows:

An aliquot portion of the pigment to be tested is mixed in a stainless steel vessel with twice the amount of anhydrous sodium carbonate and boiled in a 3% aqueous suspension for 10 minutes with reflux. After filtering off the mother liquor the procedure is repeated twice. An aliquot portion is removed from the combined mother liquors and the sodium silicate solution contained therein is dyed yellow after acidification with sulfuric acid by means of a 10% sodium molybdate solution. The color intensity determined on a Beckman spectral photometer at 400 nm yields the concentration of sodium silicate via a calibration curve.

The acid-activated phyllosilicate content of amorphous silicic acid is preferably no more than 50% by weight. The original laminar structure of the montmorillonite is still recognizable in the x-ray diffraction diagram.

Preferably acid-activated bentonite is used as the acid-activated smectic phyllosilicate.

Preferably one or several of the hydroxides, oxides, hydrogen carbonates, carbonates, silicates, aluminates, aluminum silicates and/or borates of alkali and/or alkaline metals are used as the basically reacting chemicals. Of the compounds of the alkali metals, the corresponding sodium and/or potassium compounds are preferred. Of the compounds of the earth alkali metals, the corresponding calcium compounds are preferred.

By conversion with the basically reacting chemicals, the pH of the pigment is increased from originally roughly 2 to 4 to roughly 6 to 9.5, preferably to 6.5 to 8. The pH is determined in the following way:

Ten grams of the pigment are briefly brought to a boil in 100 ml of distilled water and then filtered off hot via a folded filter; the pH is determined after cooling to room temperature using a glass electrode.

By reaction with the basically reacting substances, the specific surface of the acid-activated smectic phyllosilicate is furthermore reduced. Thus, for example the specific surface of an acid-activated bentonite is reduced from originally >280 m$^2$/g (measured using the BET method) to values between roughly 200 and 270 m$^2$/g. At the same time, by the reaction the viscosity and thixotropy of suspensions of the color developer pigment are drastically reduced. The dispersibility of the color developer pigment in aqueous media proceeds entirely without problems after treatment according to the invention with the basically reacting chemicals, and the reactivity of the active pigment is improved by the conversion.

The subject matter of the invention is furthermore a color developer pigment which can be obtained according to the above described process and which is characterized by the fact that its specific surface is smaller by at least 20 m$^2$/g than that of the acid-activated smectic phyllosilicate used as the starting material. After treatment according to the invention the color developer pigment content of interlayer hydronium ions is by no more than roughly 10% less than the content of interlayer hydronium ions of the acid-activated smectic phyllosilicate used as the starting material. The pH of the color developer pigment is between 6 and 9.5, preferably between 6.5 and 8 in a 10% aqueous suspension.

The subject matter of the invention is furthermore a color developer pigment suspension which contains the above described color developer pigment in a concentration from 30 to 50% by weight, preferably from roughly 38 to 48% by weight, especially 45% by weight.

Color developer pigment suspensions with such high concentrations could not be obtained in the past or had overly high viscosity and thixotropy so that their use as coating pigments was associated with difficulties. Moreover, the known suspension tended to thicken and to form agglomerates.

The color developer pigment suspension according to the invention contains preferably a dispersing agent in amounts of roughly 0.1 to 0.5% by weight; its pH is set to 7 to 9.5. For example, polyphosphates, polyacrylates, polycarbonic acid salts, etc. are used as dispersion agents.

The subject matter of the invention is furthermore a color developer sheet (CF) or self contained sheet (SC) for transfer papers which contains a color developer pigment as is defined above.

The invention is explained by the following examples in a nonrestrictive manner.

EXAMPLE 1

One hundred parts by weight of Bavarian calcium bentonite were activated in the conventional manner with 40 parts by weight of 30% hydrochloric acid (based on dry bentonite) for 10 hours at 95° C. The acid-activated bentonite was filtered off under a slight vacuum and washed free of chloride with distilled water. The filter cake (solid content 25% by weight) was brought to a water content of roughly 30% by weight. The content of amorphous silicic acid was determined to be 35% by weight on a wet sample. The ion exchange capacity for H$^+$ of the wet sample was 27 mVal/100 g. To determine the specific surface another sample was dried to a water content of 0% since the surface determination is not possible with the wet product. The specific surface was 305 m$^2$/g.

The wet product was transferred to a twin-shaft kneader. Then 2.0% by weight NaOH in the form of a 10% solution were sprayed over the acid-activated material; the mixture was kneaded for roughly 2 minutes. Then the product was carefully dried at 60° C. to a water content of 5% by weight and ground in a rotor beater mill to the desired grain fineness. The pH of a 10% aqueous suspension of the pigment was 7.1. The ion exchange capacity for H$^+$ of the sample was 25 meq./100 g, but compared to the ion exchange capacity of the acid-activated bentonite not yet treated with NaOH, it has essentially not changed.

The relevant data of the active pigment obtained are summarized in the table. If not already indicated, they were determined using the following methods:

Grain size analysis: A Sedigraph 5000 D was used, in which the sample (6–7 g) was prepared by 15 minutes of heating with reflux in 90 ml of a 0.002 molar $Na_4P_2O_7 \cdot 10H_2O$ solution. The residue at 10 microns (R 10 microns) and the $d_k$ value, i.e., the average grain diameter, were recorded.

Viscosity: To determine viscosity the pigments were worked into a standardized coating composition with the following formulation:

| Pigment | 100 parts by weight |
|---|---|
| Binder (DOW Latex G75) | 11 parts by weight |
| pH | 9.5 |
| Solid | 40% by weight |

In doing so mixing water was prepared and set to a pH of 9–10 using sodium hydroxide solution. The pigment was added at a constant stirrer speed of 700 rpm, the pH being kept always at 9–10 by parallel metering of NaOH. After completing the addition of pigment the binder was added at reduced stirrer rpm and then the viscosity was determined in a Brookfield viscosimeter at 10 and 100 rpm.

Color contrast: the standardized coating composition was applied using a manual doctor blade at 6 g/m$^2$ to wood-free coated base paper, dried, and equilibrated at 50% relative humidity. With this CF sheet and a commercially available blue-writing CB sheet a copy was produced on a laboratory calender and the color contrast was determined on a Ry filter of an Elrepho device (Zeiss/Datacolor) as the difference of the Ry value from the CF coating and copy:

Contrast=Ry/CF−Ry/Copy

EXAMPLE 2

Comparison

The filter cake washed free of chloride from the bentonite activated as per Example 1 was dried carefully without further additives at 80° C. to a water content of 5% by weight and ground to the desired grain fineness. The product with a pH of 3.2 corresponds to the state of the art; the results of testing are listed in the table.

EXAMPLE 3

The filter cake washed free of chloride as per Example 1 (water content 68%) was transferred to a twin-shaft kneader, the surface dusted with 3.0% by weight soda and it was kneaded for roughly 2 minutes. The product was dried to a water content of 4% by weight and ground. The pH was 7.3. The results of testing are listed in the table.

EXAMPLE 4

The test was run analogously to example 3, only instead of soda 4.8% by weight sodium hydrogen carbonate were used. The resulting pH of the pigment was 7.0. Results can be found in the table.

EXAMPLE 5

The test was run analogously to example 3, only instead of soda 4.0% by weight calcium carbonate were used. A pigment with a pH of 7.2 (10% suspension) was obtained. $CaCO_3$ could no longer be detected in an x-ray diffractometer. Results can be found in the table.

EXAMPLE 6

Comparison

The acid reference sample of Example 2 was used. The pigment was mixed at a water content of 5% by weight with 4.0% by weight calcium carbonate and tested. The pH of a 10% solution was 6.6. The x-ray diffractometer unambiguously detected $CaCO_3$. Results can be found in the table.

EXAMPLE 7

We proceeded analogously to Example 1, only 1.5% by weight NaOH were reacted with the acid-activated bentonite. The pH of a 10% suspension of the product was 6.5. Results can be found in the table.

EXAMPLE 8

We proceeded analogously to Example 1, only 2.3 by weight NaOH were reacted with the acid-activated bentonite. The pH of a 10% suspension of the product was 8.5. Results can be found in the table.

EXAMPLE 9

We proceeded analogously to Example 1, only 2.7% by weight NaOH were converted with the acid-activated bentonite. The pH of a 10% suspension of the product was 9.0. Results can be found in the table.

EXAMPLE 10

We proceeded analogously to Example 3, only 3.0% by weight of a 10% sodium aluminate solution in water were sprayed on the filter cake of the acid-activated bentonite. The pH of a 10% suspension of prepared pigment was 6.9. Results can be found in the table.

The table shows the viscosity values of the neutral or alkaline color developer pigments according to the invention according to example 1, 3 through 5 and 7 through 10. These values are clearly improved in comparison to the pigment according to Example 2 (comparison) which represents the state of the art. In addition to viscosity, thixotropy of the products was also clearly reduced so that the pigment suspensions according to the invention had a better and smoother course on the coating machine. The table shows that the decrease of viscosity goes along with the reduction of specific surface which can be explained by the reaction of the alkalis with the amorphous silicic acid bound on the corners and edges.

Examples 1 and 7 through 9 confirm the effect of alkali proportioning on the viscosity reduction. A comparison of examples 5 and 6 demonstrates the necessity of chemical reaction of the acid-activated bentonite with the basic compound which is documented in the x-ray diffraction diagram by the disappearance of the $CaCo_3$ peak. Physical mixing (comparison example 6 according to DE-B-1 809 778 or EP-B-0 144 472) has almost no effect on the pigment viscosity.

Furthermore, the table shows that the color reactivity of the products according to the invention is improved relative to the state of the art so that the blending which is conventional in practice with extender pigments such as $CaCO_3$ or kaolin is easily possible.

TABLE

| | Alkali | | pH of pigment | Spec. surface $m^2/g$ | Grain size | | Viscosity | | Color contrast |
| --- | --- | --- | --- | --- | --- | --- | --- | --- | --- |
| Example | Type | Amount % | | | R10 μm | % $d_{k/\mu m}$ | 10 rpm | 100 rpm | % |
| 1 | NaOH | 2.0 | 7.1 | 250 | 4 | 2.55 | 410 | 290 | 37.5 |
| 2 | — | — | 3.1 | 308 | 5 | 2.5 | 1800 | 780 | 35 |
| 3 | $Na_2CO_3$ | 3.0 | 7.3 | 248 | 5 | 2.7 | 400 | 270 | 39 |
| 4 | $NaHCO_3$ | 4.8 | 7.0 | 256 | 5 | 2.7 | 500 | 300 | 38 |
| 5 | $CaCO_3$ | 4.0 | 7.2 | 252 | 4 | 2.6 | 395 | 290 | 39.5 |
| 6 | $CaCO_3$ | 4.0 | 6.6 | 301 | 4 | 2.6 | 1780 | 785 | 38.5 |
| 7 | NaOH | 1.5 | 6.5 | 280 | 3 | 2.3 | 1240 | 510 | 37.5 |
| 8 | NaOH | 2.3 | 8.5 | 237 | 4 | 2.65 | 325 | 215 | 40 |
| 9 | NaOH | 2.7 | 9.0 | 202 | 3 | 2.35 | 203 | 155 | 39 |
| 10 | $NaAlO_2$ | 3.0 | 6.9 | 253 | 4 | 2.5 | 380 | 280 | 40.5 |

We claim:

1. A process for producing neutral to alkaline color developer pigments for use in carbon-free copying papers from an acid-activated smectic phyllosilicate and basically reacting chemicals, comprising reacting the acid-activated phyllosilicate in the form of crystallites which contain a layer structure which is essentially still intact without intermediate drying, with the basically-reacting chemicals up to partial or complete decomposition of amorphous silicic acid which is formed on the corners and edges of the phyllosilicate crystallites without significant re-exchange of hydronium ions which are incorporated between the layers of the phyllosilicate by alkali or alkaline metal ions.

2. The process of claim 1, wherein the reaction of the acid-activated smectic phyllosilicate is done with the basically reacting chemicals at a water content of roughly 75 to 15% by weight.

3. The process of claim 1, wherein the acid-activated smectic phyllosilicate has a specific surface area of roughly 280 to 350 m²/g and a content of amorphous silicic acid from 20 to 45% by weight, relative to all the material.

4. The process of claim 1, wherein an acid-activated bentonite is used as the acid-activated smectic phyllosilicate.

5. The process of claim 1, wherein the basically reacting chemicals are selected from the group comprising hydroxides, oxides, hydrogen carbonates, carbonates, silicates, aluminates, aluminum silicates, and borates of alkali or alkaline-metals.

6. A color developer pigment which can be obtained according to the process of claim 1, wherein its specific surface area is smaller by at least 20 m²/g than that of the acid-activated smectic phyllosilicate.

7. The color developer pigment of claim 6, wherein its content of interlayer hydronium ions is less by no more than roughly 10% than the content of interlayer hydronium ions of the acid-activated smectic phyllosilicate.

8. A 10% aqueous suspension containing the color developer pigment of claim 7, wherein the pH of the suspension is between 6 and 9.5.

9. An aqueous color developer pigment suspension containing the color developer pigment of claim 6, wherein the concentration of the color developer pigment is from 30 to 50% by weight.

10. The aqueous color developer pigment suspension of claim 9 which contains a dispersing agent in amounts of about 0.1 to 0.5% by weight and wherein its pH is set to 7 to 9.5.

11. A 10% aqueous suspension containing the color developer pigment of claim 7, wherein the pH of the suspension is between 6.5 and 8.

12. An aqueous color developer pigment suspension containing the color developer pigment of claim 7, wherein the concentration of the color developer pigment is from 38 to 48% by weight.

13. An aqueous color developer pigment suspension containing the color developer pigment of claim 6, wherein the concentration of the color developer pigment is about 45% by weight.

14. A color developer sheet or self-contained sheet for transfer papers comprising a paper substrate, a binder and the color developer pigment of claim 6.

15. The process of claim 1, wherein the reaction of the acid-activated smectic phyllosilicate is done with the basically reacting chemicals at a water content of about 70 to 20% by weight.

16. The process of claim 1 wherein the reaction of the acid activated smectic phyllosilicate is done at temperatures between about 20° and 50° C. and at a reaction time of less than 5 minutes.

* * * * *